US012663641B2

(12) United States Patent
Ogawa et al.

(10) Patent No.: US 12,663,641 B2
(45) Date of Patent: Jun. 23, 2026

(54) LINE-OF-SIGHT DETECTION APPARATUS, DISPLAY APPARATUS, LINE-OF-SIGHT DETECTION SYSTEM, AND LINE-OF-SIGHT DETECTION METHOD

(71) Applicant: SONY GROUP CORPORATION, Tokyo (JP)

(72) Inventors: Ryo Ogawa, Kanagawa (JP); Yuki Mamishin, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 200 days.

(21) Appl. No.: 18/562,996

(22) PCT Filed: Feb. 2, 2022

(86) PCT No.: PCT/JP2022/003927
§ 371 (c)(1),
(2) Date: Nov. 21, 2023

(87) PCT Pub. No.: WO2022/254782
PCT Pub. Date: Dec. 8, 2022

(65) Prior Publication Data
US 2024/0264435 A1      Aug. 8, 2024

(30) Foreign Application Priority Data

Jun. 2, 2021      (JP) ................................. 2021-092740

(51) Int. Cl.
*G02B 27/00*      (2006.01)
*G02B 27/01*      (2006.01)
*G06F 3/01*      (2006.01)
(52) U.S. Cl.
CPC ..... *G02B 27/0093* (2013.01); *G02B 27/0172* (2013.01); *G06F 3/013* (2013.01); *G02B 2027/014* (2013.01)

(58) Field of Classification Search
CPC ........... G02B 27/0093; G02B 27/0172; G02B 2027/014; G02B 2027/0138; G06F 3/013; G06F 3/011
See application file for complete search history.

(56) References Cited

U.S. PATENT DOCUMENTS

2020/0026349 A1      1/2020 Fontanel et al.
2020/0278539 A1      9/2020 Petljanski et al.

FOREIGN PATENT DOCUMENTS

| JP | 2020-081449 | 6/2020 |
| JP | 2020-536309 | 12/2020 |
| WO | WO 2019/067731 | 4/2019 |

OTHER PUBLICATIONS

International Search Report and Written Opinion prepared by the Japan Patent Office on Mar. 14, 2022, for International Application No. PCT/JP2022/003927, 2 pgs.

*Primary Examiner* — Mariam Qureshi
(74) *Attorney, Agent, or Firm* — SHERIDAN ROSS P.C.

(57) ABSTRACT
To obtain eye-related position information at an appropriate time. Provided is a line-of-sight detection apparatus line-of-sight detection apparatus including: an illumination unit that illuminates an eye with a plurality of illumination light rays; a determination unit that determines a time to cause the illumination unit to illuminate the eye; an illumination control unit that controls the illumination unit; an image pickup element having an event-driven function; and an arithmetic unit that computes eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

12 Claims, 6 Drawing Sheets

LINE-OF-SIGHT DETECTION APPARATUS, DISPLAY APPARATUS, LINE-OF-SIGHT DETECTION SYSTEM, AND LINE-OF-SIGHT DETECTION METHOD

CROSS REFERENCE TO RELATED APPLICATIONS

This application is a national stage application under 35 U.S.C. 371 and claims the benefit of PCT Application No. PCT/JP2022/003927, having an international filing date of 2 Feb. 2022, which designated the United States, which PCT application claimed the benefit of Japanese Patent Application No. 2021-092740, filed 2 Jun. 2021, the entire disclosures of each of which are incorporated herein by reference.

TECHNICAL FIELD

The present technology relates to a line-of-sight detection apparatus, a display apparatus, a line-of-sight detection system, and a line-of-sight detection method.

BACKGROUND ART

An eye sensing technology is expected to be used for various technologies. For example, the eye sensing technology is expected to be used for brain and neuroscience, biological engineering, and medical science in the fields of research. An eye tracking technology is expected to be used for technology transfer and UX improvement, etc. in the industrial fields. In addition, an iris recognition technology is expected to be used for security technologies.

In addition, the eye sensing technology is in recent years used for foveated rendering, viewable region (eye box) extension, and the like in technologies, such as augmented reality (AR) and virtual reality (VR) using a head-mounted display, where the development competition is fierce.

For example, Patent Literature 1 has disclosed a technology of performing eye tracking while sequentially switching light sources for emitting light.

CITATION LIST

Patent Literature

Patent Literature 1: WO 2019/067731

DISCLOSURE OF INVENTION

Technical Problem

However, the technology disclosed in Patent Literature 1 for example cannot obtain eye-related position information at an appropriate time in some cases.

In view of this, it is a main object of the present technology to provide a line-of-sight detection apparatus that obtains eye-related position information at an appropriate time, a display apparatus including such a line-of-sight detection apparatus, a line-of-sight detection system, and a line-of-sight detection method.

Solution to Problem

The present technology provides a line-of-sight detection apparatus including: an illumination unit that illuminates an eye with a plurality of illumination light rays; a determination unit that determines a time to cause the illumination unit to illuminate the eye; an illumination control unit that controls the illumination unit; an image pickup element having an event-driven function; and an arithmetic unit that computes eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

The determination unit may obtain the determination result that a movement of a user has occurred on the basis of the event information, and the illumination control unit may cause the illumination unit to illuminate the eye on the basis of the determination result.

The movement of the user may include an open/close movement of an eyelid, and the determination unit may obtain the determination result that the movement of the user has occurred in a case where the open/close movement of the eyelid has been made.

The movement of the user may include a change in pupil diameter size, and the determination unit may obtain the determination result that the movement of the user has occurred in a case where an amount of change in pupil diameter size is equal to or larger than a predetermined threshold.

The movement of the user may include a saccade, and the determination unit may obtain the determination result that the movement of the user has occurred in a case where velocity of the saccade is equal to or larger than a predetermined threshold.

The line-of-sight detection apparatus may further include an environment detection unit that detects an environment of a user, in which the determination unit may obtain the determination result that the environment of the user has changed on the basis of a detection result of the environment detection unit, and the illumination control unit may cause the illumination unit to illuminate the eye on the basis of the determination result.

The detection result of the environment detection unit may include an illuminance, and the determination unit may obtain the determination result that the environment of the user has changed in a case where an amount of change in illuminance is equal to or larger than a predetermined threshold.

Moreover, the present technology provides a display apparatus at least including the line-of-sight detection apparatus.

The display apparatus may further include an action detection unit that detects an action of a user, in which the determination unit may obtain the determination result that an action of the user has been made on the basis of a detection result of the action detection unit, and the illumination control unit may cause the illumination unit to illuminate the eye on the basis of the determination result.

The action of the user may include the display apparatus being worn by a head of the user, and the determination unit may obtain the determination result that the action of the user has been made in a case where the display apparatus is worn by the head of the user.

The action of the user may include an operation of the user being made on the display apparatus, and the determination unit may obtain the determination result that the action of the user has been made in a case where the operation of the user is made on the display apparatus.

The display apparatus according may further include a video detection unit that detects a video displayed by the display apparatus, in which the determination unit may obtain the determination result that the video has changed on the basis of a detection result of the video detection unit, and the illumination control unit may cause the illumination unit to illuminate the eye on the basis of the determination result.

The detection result of the video detection unit may include a luminance of the video, and the determination unit may obtain the determination result that the video has changed in a case where an amount of change in luminance is equal to or larger than a predetermined threshold.

Moreover, the present technology provides a line-of-sight detection system including: an illumination unit that illuminates an eye with a plurality of illumination light rays; a determination unit that determines a time to cause the illumination unit to illuminate the eye; an illumination control unit that controls the illumination unit; an image pickup element having an event-driven function; and an arithmetic unit that computes eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

Moreover, the present technology provides a line-of-sight detection method including: determining a time to illuminate an eye; illuminating the eye with a plurality of illumination light rays on the basis of a result of the determination; generating event information by receiving light reflected from the eye through an image pickup element having an event-driven function; and computing eye-related position information on the basis of the event information.

In accordance with the present technology, eye-related position information can be obtained at an appropriate time. It should be noted that the effects set forth herein are not necessarily limited and may be any one of the effects described in the present disclosure.

MODE(S) FOR CARRYING OUT THE INVENTION

Figure 1:
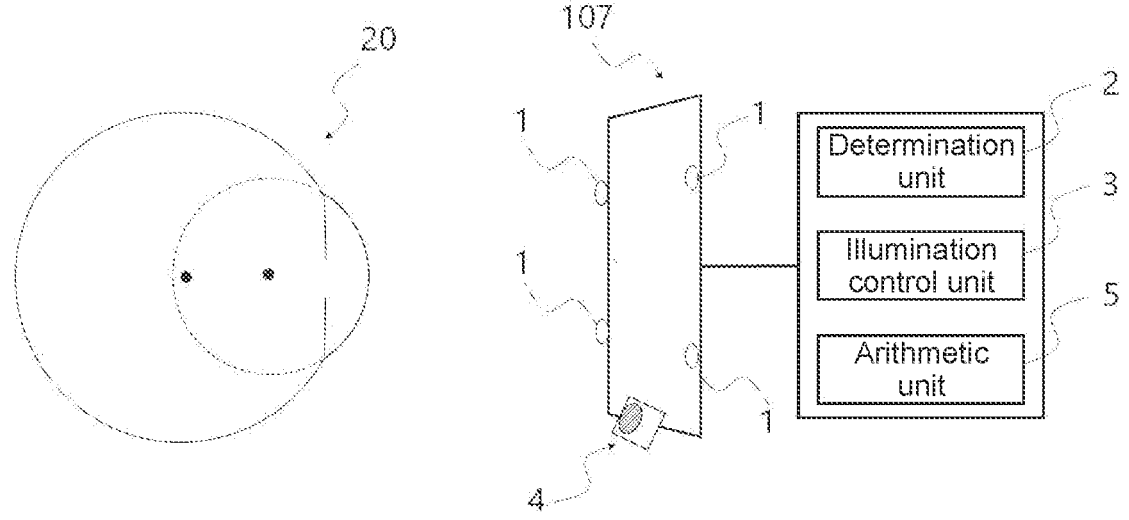
FIG. 1 A schematic diagram showing a configuration example of a line-of-sight detection apparatus 107 according to a first embodiment of the present technology.

Hereinafter, favorable modes for carrying out the present technology will be described. Embodiments described below show examples of typical embodiments of the present technology. The scope of the present technology should not be understood narrowly due to these embodiments.

Descriptions will be given in the following order.
1. Outline of Present Technology
2. First Embodiment (Example 1 of Line-of-Sight Detection Apparatus)
3. Second Embodiment (Example 2 of Line-of-Sight Detection Apparatus)
4. Third Embodiment (Example 1 of Display Apparatus)
5. Fourth Embodiment (Example 2 of Display Apparatus)
6. Fifth Embodiment (Example 3 of Display Apparatus)
7. Sixth Embodiment (Example of Line-of-Sight Detection System)
8. Seventh Embodiment (Example of Line-of-Sight Detection Method)

1. Outline of Present Technology

Conventionally, a technology of obtaining eye-related position information by irradiating an eye with infrared light and receiving reflected light by an image pickup element such as an image sensor has been used. The eye irradiation with infrared light facilitates discrimination between a pupil and an iris.

Moreover, it is desirable to reduce power consumption of a wearable apparatus, e.g., a head-mounted display, which obtains eye-related position information. In view of this, the present technology uses an image pickup element having an event-driven function, e.g., a dynamic vision sensor (DVS). The DVS can contribute to power consumption reduction because only pixels that have changed in luminance generate event information in the DVS. In addition, the DVS can generate event information highly accurately because the DVS has a high temporal resolution.

However, the DVS can generate much noise because the respective pixels of the DVS generate event information every time the respective pixels change in luminance. There is a problem in that this noise makes it impossible for the DVS to highly accurately obtain eye-related position information.

In addition, there is also a problem in that eye blinking, a quick eyeball movement (saccade), or the like makes it temporarily impossible to obtain eye-related position information. Moreover, there is also a problem in that the accuracy of obtaining eye-related position information lowers because the DVS generates less event information with fine eyeball movements.

As one of solutions for such problems, the luminance is forcibly changed by radiation to the eye so as to forcibly obtain eye-related position information.

However, event information several hundreds of thousands of times more than normal is generated because almost all pixels generate event information when the luminance is forcibly changed. There is a problem in that reading out is delayed when almost all pixels generate event information because the event information generated by the pixels is sequentially read out for each scanning line. Moreover, because of the high temporal resolution of the DVS, the respective pixels may generate a plurality of pieces of event information in a single shot of irradiation, which increases the delay. In addition, there is also a problem in that the power consumption increases when almost all pixels generate event information because the event information generation consumes electric power.

In view of this, the present technology provides a line-of-sight detection apparatus that obtains eye-related position information at an appropriate time with a determination unit that determines a time to irradiate the eye. Accordingly, the line-of-sight detection apparatus according to the present technology can highly accurately obtain eye-related position information. In addition, the line-of-sight detection apparatus according to the present technology can contribute to a processing delay reduction and a power consumption reduction, for example.

Hereinafter, favorable modes for carrying out the present technology will be described in detail with reference to the drawings. It should be noted that in the drawings, the term "upper" means an upper direction or upper side in the figure, the term "lower" means a lower direction or lower side in the figure, the term "left" means a left-hand direction or left-hand side in the figure, and the term "right" means a right-hand direction or right-hand side in the figure unless otherwise stated herein. Moreover, in the description referring to the drawings, identical or equivalent elements or members will be denoted by the same reference signs and duplicate description will be omitted.

2. First Embodiment (Example 1 of Line-of-Sight Detection Apparatus)

A line-of-sight detection apparatus according to a first embodiment is a line-of-sight detection apparatus including an illumination unit that illuminates an eye with a plurality of illumination light rays, a determination unit that determines a time to cause the illumination unit to illuminate the eye, an illumination control unit that controls the illumination unit, an image pickup element having an event-driven function, and an arithmetic unit that computes the eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

The line-of-sight detection apparatus according to the first embodiment of the present technology will be described with reference to FIG. 1. FIG. 1 is a schematic diagram showing a configuration example of a line-of-sight detection apparatus 107 according to the first embodiment of the present technology.

As shown in FIG. 1, the line-of-sight detection apparatus 107 according to the first embodiment of the present technology includes an illumination unit 1 that illuminates an eye 20 with a plurality of illumination light rays, a determination unit 2 that determines a time to cause the illumination unit 1 to illuminate the eye, an illumination control unit 3 that controls the illumination unit 1, an image pickup element 4 having an event-driven function, and an arithmetic unit 5 that computes position information related to the eye 20.

First of all, the determination unit 2 determines a time to cause the illumination unit 1 to illuminate the eye. Various determination means will be described later. For example, a central processing unit (CPU) provided in a computer can be used for the determination unit 2. The CPU reading a program can achieve the determination unit 2. It should be noted that a learning model in a deep neural network or the like can be used as an example of the program.

Next, the illumination control unit 3 causes the illumination unit 1 to illuminate the eye 20 on the basis of a determination result of the determination unit 2. The illumination control unit 3 can be achieved by using a modulator, for example.

Then, the illumination unit 1 illuminates the eye 20 with a plurality of illumination light rays. The illumination unit 1 can be achieved by using an LED, for example. As described above, the illumination light is favorably infrared light. It should be noted that the light emission pattern of the illumination unit 1 is not limited to a circular shape.

Two or more illumination light rays are favorably used and four or more illumination light rays are more favorably used. This can prevent a case where reflected light cannot be completely received depending on the eyeball's orientation for example. Owing to the plurality of illumination light rays, at least one illumination light ray can be received.

Then, the image pickup element 4 having the event-driven function generates event information by receiving light reflected from the eye 20. For example, a DVS can be used for the image pickup element 4 having the event-driven function.

Last of all, the arithmetic unit 5 computes position information related to the eye 20 on the basis of the event information. In particular, the arithmetic unit 5 computes eyeball movement information and/or pupil position information. For example, a CPU provided in a computer can be used for the arithmetic unit 5. The CPU reading a program can achieve the arithmetic unit 5. It should be noted that a learning model in a deep neural network or the like can be used as an example of the program.

Figure 2:
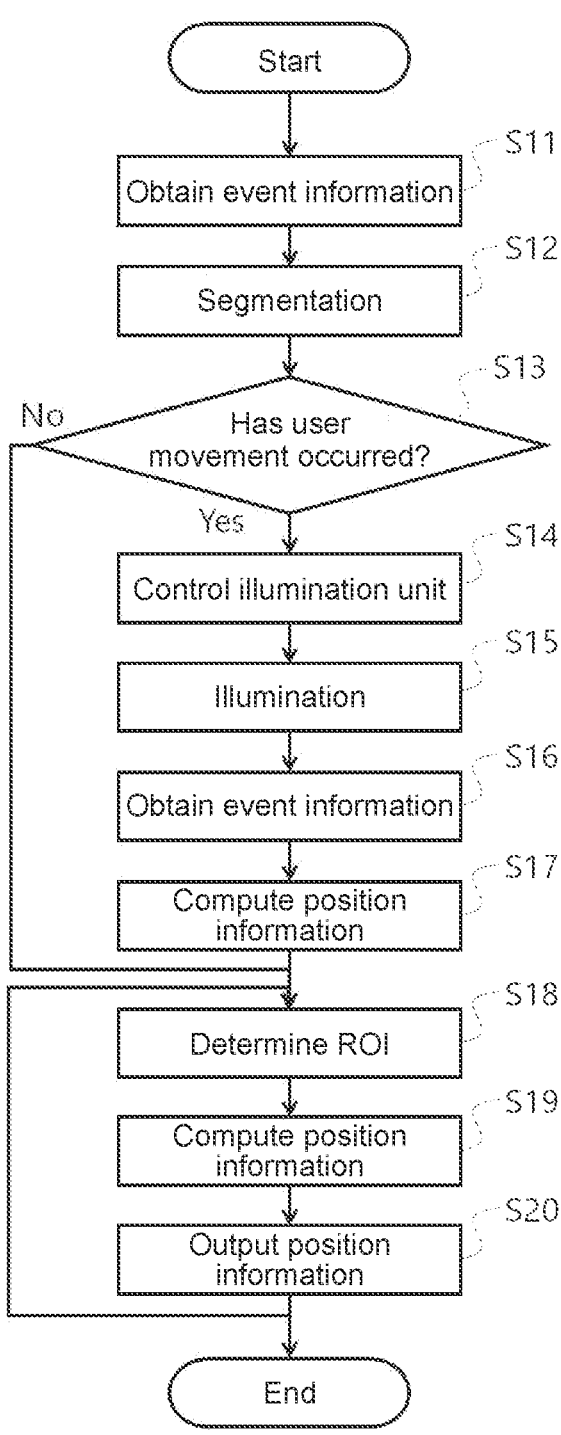
FIG. 2 A flowchart showing an example of a flow of processing of the line-of-sight detection apparatus 107 according to the first embodiment of the present technology.

A flow of processing of the line-of-sight detection apparatus 107 according to the first embodiment of the present technology will be described with reference to FIG. 2. FIG. 2 is a flowchart showing an example of a flow of processing of the line-of-sight detection apparatus 107 according to the first embodiment of the present technology.

As shown in FIG. 2, in Step S11, the arithmetic unit 5 obtains event information generated by the image pickup element 4 receiving light reflected from the eye.

Figure 3:
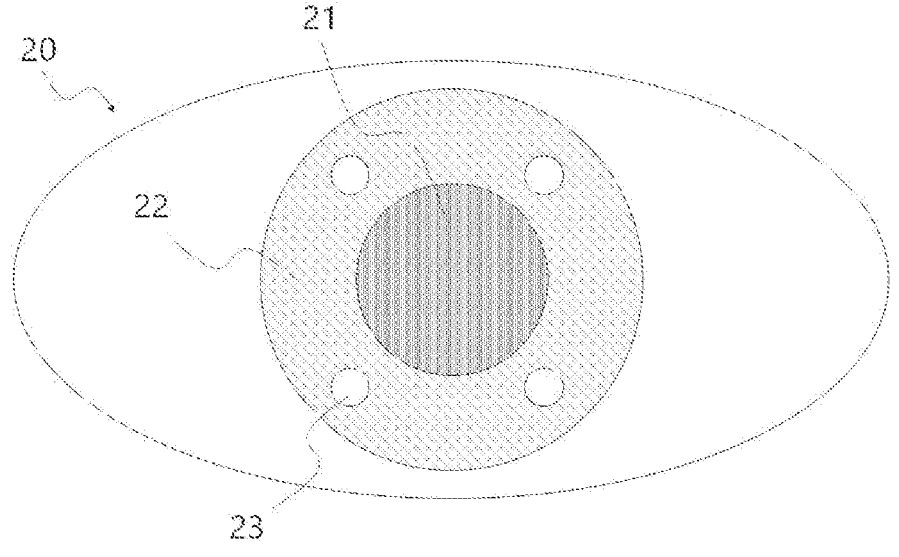
FIG. 3 A simplified diagram showing a configuration of an eye 20.

In Step S12, the arithmetic unit 5 performs segmentation related to the eye on the basis of the obtained event information. This segmentation will be described with reference to FIG. 3. FIG. 3 shows a configuration of a simplified diagram of the eye 20. As shown in FIG. 3, the eye 20 has a pupil 21 and an iris 22. Moreover, Purkinje images 23 generated by reflected light of illumination light from the illumination unit 1 are detected.

The arithmetic unit 5 performs segmentation for respective regions of the Purkinje images 23, the pupil 21, and the iris 22, for example, on the basis of input event information.

Referring back to FIG. 2, in Step S13, the determination unit 2 determines whether or not a movement of a user has occurred. Examples of the movement of the user may include an open/close movement of an eyelid, a change in pupil diameter size, a saccade, wearing of the apparatus, and an operation on the apparatus. The open/close movement of the eyelid may include involuntary blinking and voluntary winking. There is a possibility that the line-of-sight detection apparatus 107 cannot obtain positions of the pupil 21 and the like due to such a movement of the user. Therefore, the time at which such a movement of the user is made is an appropriate time to obtain the eye-related position information.

Although the information input to the determination unit 2 is not particularly limited, for example, event information generated by the image pickup element 4 may be input to the determination unit 2. The determination unit 2 can obtain a determination result that the movement of the user has occurred on the basis of the event information. For example, when event information with a specific waveform is input to the determination unit 2, the determination unit 2 determines that the open/close movement of the eyelid has been made and obtains the determination result that the movement of the user has occurred. The obtained determination result enables the line-of-sight detection apparatus 107 to obtain the eye-related position information at an appropriate time. As a result, the line-of-sight detection apparatus 107 can highly accurately obtain eye-related position information.

For example, a technology disclosed in Non-Patent Literature 1 below can be used as a technology of determining the open/close movement of the eyelid.

Non-Patent Literature 1: "Real-Time Face & Eye Tracking and Blink Detection using Event Cameras", 2020, https://arxiv.org/abs/2010.08278

Alternatively, in a case where an amount of change in pupil diameter size is equal to or larger than a predetermined threshold, the determination unit 2 obtains the determination result that the movement of the user has occurred. For example, in a case where the amount of change in pupil diameter size is equal to or larger than 2 mm, the determination unit 2 obtains the determination result that the movement of the user has occurred.

The obtained determination result enables the line-of-sight detection apparatus 107 to obtain the eye-related position information at an appropriate time. As a result, the line-of-sight detection apparatus 107 can highly accurately obtain eye-related position information.

Alternatively, in a case where velocity of the saccade is equal to or larger than a predetermined threshold, the determination unit 2 obtains the determination result that the movement of the user has occurred. For example, in a case where the velocity of the saccade is equal to or larger than 20 deg./sec., the determination unit 2 obtains the determination result that the movement of the user has occurred.

The obtained determination result enables the line-of-sight detection apparatus 107 to obtain the eye-related position information at an appropriate time. As a result, the line-of-sight detection apparatus 107 can highly accurately obtain eye-related position information.

Subsequently, in Step S14, the illumination control unit 3 controls the illumination unit 1 to illuminate the eye on the basis of the determination result. In a case where the determination unit 2 obtains the determination result that the movement of the user has occurred (Step S13: Yes), the illumination control unit 3 controls the illumination unit 1 to illuminate the eye.

In Step S15, the illumination unit 1 illuminates the eye with a plurality of illumination light rays.

In Step S16, the arithmetic unit 5 obtains event information generated by the image pickup element 4 receiving light reflected from the eye.

In Step S17, the arithmetic unit 5 computes position information of the region of each of the Purkinje images 23, the pupil 21, and the iris 22, for example, on the basis of the event information.

In Step S18, the arithmetic unit 5 determines a region of interest (ROI) on the basis of the position information of the region of each of the Purkinje images 23, the pupil 21, and the iris 22, for example. The ROI is a region determined as an analysis target in image data.

In Step S19, the arithmetic unit 5 computes three-dimensional position information related to the eye on the basis of the position information of the Purkinje images 23 and/or the pupil 21. This position information can be used for determining the ROI as previous frame information (Step S18).

In Step S20, the arithmetic unit 5 outputs the three-dimensional position information related to the eye.

It should be noted that In Step S13, in a case where the determination unit 2 does not obtain the determination result that the movement of the user has occurred (Step S13: No), the processing after Step S18 is performed.

The above-mentioned contents of the line-of-sight detection apparatus according to the first embodiment of the present technology can be applied to other embodiments of the present technology unless technical contradictions are caused.

3. Second Embodiment (Example 2 of Line-of-Sight Detection Apparatus)

A line-of-sight detection apparatus according to a second embodiment of the present technology is a line-of-sight detection apparatus further including an environment detection unit that detects an environment of the user, in which the determination unit obtains a determination result that the environment of the user has changed on the basis of a detection result of the environment detection unit and the illumination control unit causes the illumination unit to illuminate the eye on the basis of the determination result.

Figure 4:
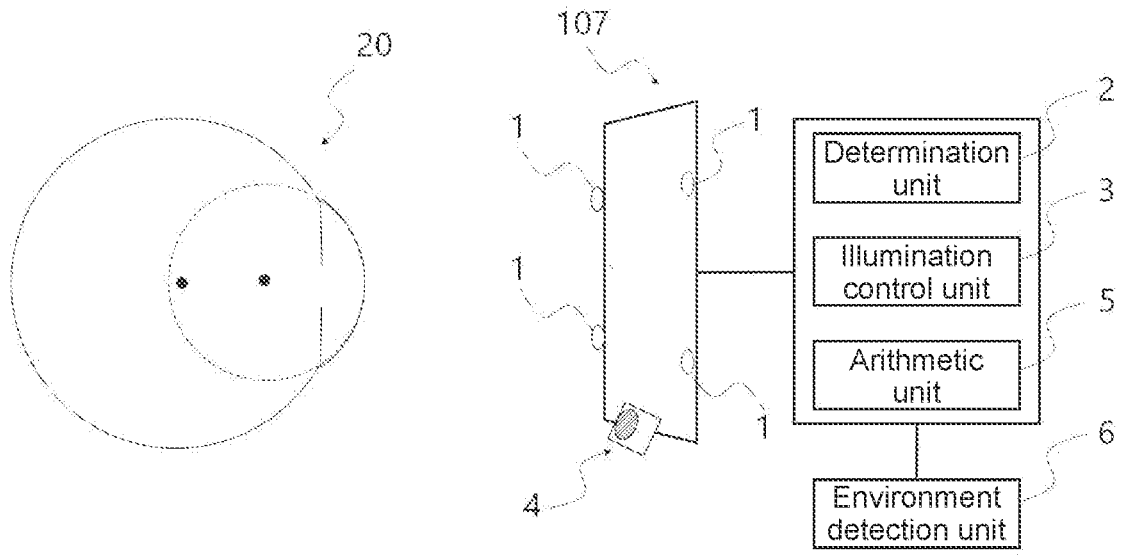
FIG. 4 A schematic diagram showing a configuration example of a line-of-sight detection apparatus 107 according to a second embodiment of the present technology.

The line-of-sight detection apparatus according to the second embodiment of the present technology will be described with reference to FIG. 4. FIG. 4 is a schematic diagram showing a configuration example of a line-of-sight detection apparatus 107 according to the second embodiment of the present technology.

As shown in FIG. 4, the line-of-sight detection apparatus 107 according to the second embodiment of the present technology further includes an environment detection unit 6 that detects an environment of the user. For example, a sensor that obtains brightness as a numeric value, such as illuminance meter and image sensor, can be used as the environment detection unit 6.

The determination unit 2 obtains the determination result that the environment of the user has changed on the basis of a detection result of the environment detection unit 6. For example, in a case where the illuminance meter is used as the environment detection unit 6, the detection result includes an illuminance. The determination unit 2 obtains the determination result that the environment of the user has changed in a case where an amount of change in illuminance is equal to or larger than a predetermined threshold. For example, in a case where the changed illuminance is ten times or more as high as the illuminance before the change or in a case where the changed illuminance is equal to or lower than $\frac{1}{10}$ of the illuminance before the change, the determination unit 2 obtains the determination result that the environment of the user has changed.

The illumination control unit 3 causes the illumination unit 1 to illuminate the eye on the basis of the determination result. Accordingly, the line-of-sight detection apparatus 107 can obtain the eye-related position information at an appropriate time. As a result, the line-of-sight detection apparatus 107 can highly accurately obtain eye-related position information.

The pupil diameter size of the user will change, for example, when the user moves to a bright place from a dark place. Therefore, the illumination control unit 3 can cause the illumination unit 1 to illuminate the eye.

The above-mentioned contents of the line-of-sight detection apparatus according to the second embodiment of the present technology can be applied to other embodiments of the present technology unless technical contradictions are caused.

4. Third Embodiment (Example 1 of Display Apparatus)

A display apparatus according to a third embodiment of the present technology is a display apparatus at least including the line-of-sight detection apparatus according to the first or second embodiment of the present technology. The display apparatus according to the third embodiment of the present technology can be applied to, for example, an eyewear display of a head-mounted display.

The display apparatus according to the third embodiment of the present technology includes a video display unit, a sensor (also referred to as a displacement sensor) that detects an amount of change in display apparatus position with respect to the head of the user, the line-of-sight detection apparatus according to the first or second embodiment of the present technology, a projection position adjustment mechanism, a control unit, and a storage unit, for example.

Figure 5:
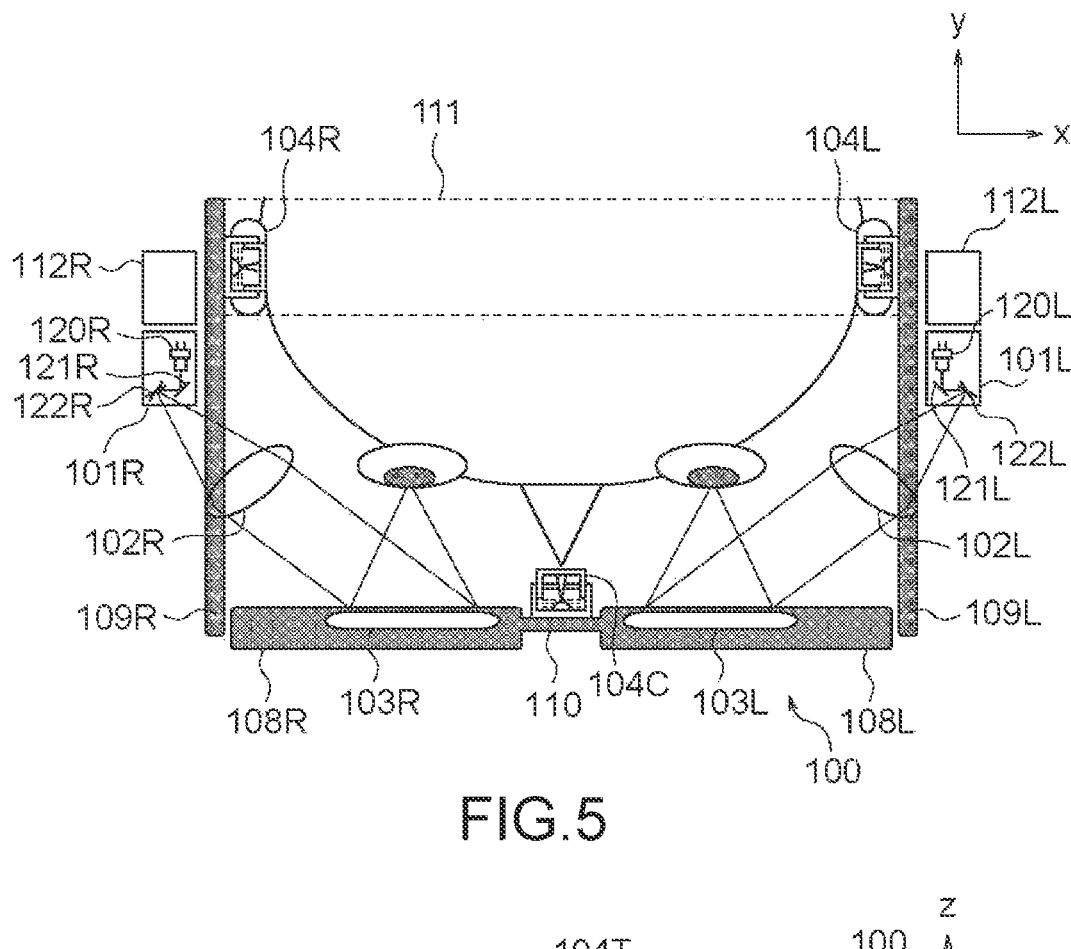
FIG. 5 A top view of a display apparatus 100 according to a third embodiment of the present technology, which is worn by the head of a user.
Figure 6:
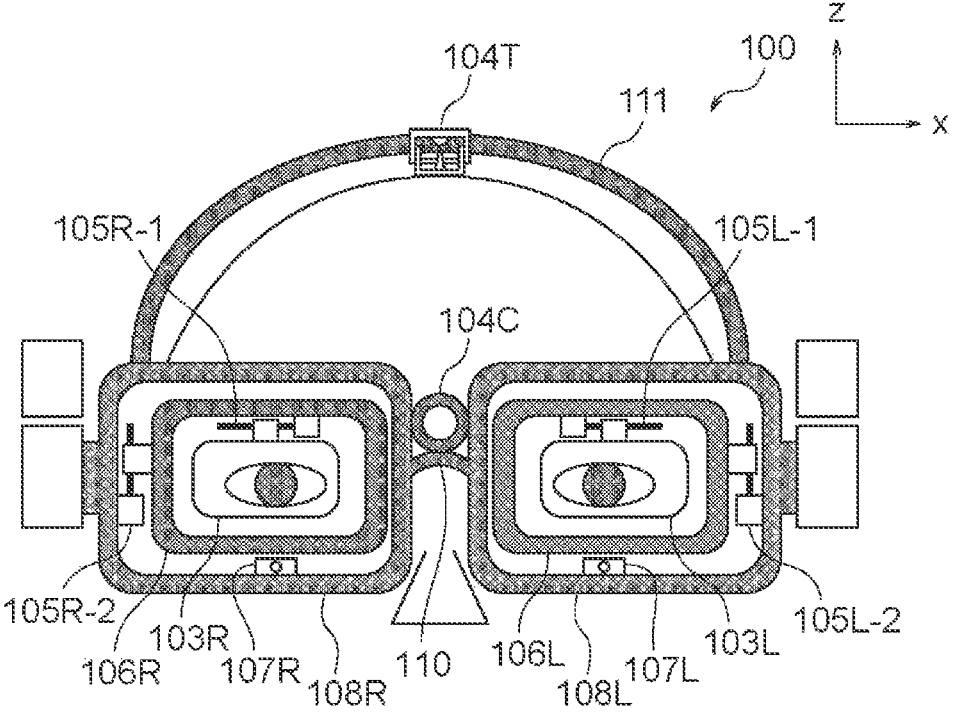
FIG. 6 A front view of the display apparatus 100 according to the third embodiment of the present technology, which is worn by the head of the user.

A configuration example of the display apparatus according to the third embodiment of the present technology will be described with reference to FIGS. 5 and 6. FIG. 5 is a top view of a display apparatus 100 according to the third embodiment of the present technology, which is worn by the head of the user. FIG. 6 is a front view of the display apparatus 100 according to the third embodiment of the present technology, which is worn by the head of the user. (Video Display Unit)

As shown in FIGS. 5 and 6, the display apparatus 100 includes a temple portion 109L and a rim portion 108L, which are parts of the eyeglasses shape. A light source unit 101L and a projection optical system 102L are arranged in the temple portion 109L. A holographic optical element (HOE) 103L is retained in the rim portion 108L. More specifically, an internal rim portion 106L is retained in the rim portion 108L via a projection position adjustment mechanism 105L-2. The HOE 103L is retained in the internal rim portion 106L via a projection position adjustment mechanism 105L-1.

For example, a holographic lens, favorably a film-like holographic lens, and more favorably a transparent, film-like holographic lens can be used as the HOE 103L. The film-like holographic lens may be used, for example, bonded on a glass. Desired optical characteristics can be applied to the holographic lens by a known technique in the related art. Then, a commercially available holographic lens may be used as the holographic lens or the holographic lens may be fabricated by a publicly known technique in the related art.

The display apparatus 100 is configured to project video display light to each of both eyes of the user. That is, the display apparatus 100 includes a left-eye video display unit that projects video display light to the left eye and a right-eye video display unit that projects video display light to the right eye.

The left-eye video display unit includes the light source unit 101L, the projection optical system 102L, and the HOE 103L.

The light source unit 101L emits video display light. The light source unit 101L can include, for example, a laser light source 120L, a mirror 121L, and a scanning mirror 122L as components for emitting the video display light.

Laser light emitted from the laser light source 120L is reflected by the mirror 121L and reaches the scanning mirror 122L. The scanning mirror 122L two-dimensionally scans the laser light. The scanning mirror 122L may be, for example, a MEMS mirror. The scanning mirror 122L can move the direction of the laser light at high speed so that an image is formed on the retina.

The projection optical system 102L adjusts the direction of the video display light so that the video display light reaches a desired region and/or position of the HOE 103L. For example, the projection optical system 102L converts the video display light scanned by the scanning mirror 122L into parallel light.

The HOE 103L diffracts the video display light so that the video display light is concentrated at the vicinity of the pupil of the user and then radiated to the retina. The HOE 103L may be, for example, a reflective diffraction element. The HOE 103L can have optical characteristics in that the HOE 103L acts as a lens with respect to light in a wavelength range of the video display light and transmits light having wavelengths out of the wavelength range therethrough. The optical characteristics enable the user to recognize an image formed by the video display light while recognizing a landscape in the line-of-sight direction, for example, through the HOE 103L. That is, the display apparatus 100 enables superimposition of the image formed by the video display light on the external landscape.

As described above, the light source unit 101L, the projection optical system 102L, and the HOE 103L enable the video display light to reach the left eye of the user.

The right-eye video display unit includes a light source unit 101R, a projection optical system 102R, and an HOE 103R. The same as the description of the light source unit 101L, the projection optical system 102L, and the HOE 103L applies to the light source unit 101R, the projection optical system 102R, and the HOE 103R.

The light source unit 101R and the projection optical system 102R are arranged in a temple portion 109R as in the left-eye video display unit. The HOE 103R is retained in the rim portion 108R. More specifically, an internal rim portion 106R is retained in the rim portion 108R via a projection position adjustment mechanism 105R-2. The HOE 103R is retained in the internal rim portion 106R via a projection position adjustment mechanism 105R-1.

The use of the laser light source 120L and a laser light source 120R enables presentation of stimulation with a particular wavelength. Although the light source unit 101L shown in FIG. 6 includes the single laser light source 120L, two or more laser light sources of the light source unit 101L may be provided. For example, two or more and five or less laser light sources may be provided. These laser light sources may output laser light having different wavelengths. Also, two or more laser light sources of the light source unit 101R may be provided. For example, two or more and five or less laser light sources may be provided. These laser light sources may output laser light having different wavelengths.

The rim portions 108L and 108R of the display apparatus 100 are connected via a bridge portion 110. The bridge portion 110 is a portion put on the nose of the user when the user wears the display apparatus 100.

The rim portions 108L and 108R of the display apparatus 100 are connected to a headband portion 111. The headband portion 111 is a portion that is held in contact with the top of the head of the user when the user wears the display apparatus 100.

Although it is not shown in the figure, the display apparatus 100 may further include a wavelength dispersion compensating member. Since the wavelength dispersion compensating member compensates for wavelength dispersion, stimulation at any point (predetermined point) on the retina can be correctly performed. The wavelength dispersion compensating member can be, for example, a reflective or transmissive volume hologram or a reflective or transmissive relief hologram. The wavelength dispersion compensating member may be arranged in the periphery of the mirror 121L and/or 121R. The wavelength dispersion compensating member may be arranged, for example, between the mirror 121L and the scanning mirror 122L and/or between the mirror 121R and a scanning mirror 122R.

(Sensor)

The display apparatus 100 can further include sensors 104L, 104R, 104C, and 104T that detect a change in position of the display apparatus 100 with respect to the head of the user. The change in position detected by these sensors may be, for example, a direction of the change in position and/or an amount of change in position. It should be noted that in the present specification, the sensors 104L, 104R, 104C, and 104T will be sometimes called together sensor 104.

The sensors 104L and 104R detect a change in position of the display apparatus 100 with respect to the head of the user in the horizontal direction. The sensor 104C detects a change in position of the display apparatus 100 with respect to the head of the user in the front-rear direction. The sensor 104T detects a change in position of the display apparatus 100 with respect to the head of the user in the upper and lower directions. The sensor 104 can detect, for example, a three-dimensional wearing error of the display apparatus 100 or re-wearing of the display apparatus 100 by the user.

(Line-of-Sight Detection Apparatus)

The display apparatus 100 can further include line-of-sight detection apparatuses 107L and 107R that detect lines-of-sight of the user. It should be noted that in the present specification, the line-of-sight detection apparatuses 107L and 107R will be sometimes called together line-of-sight detection apparatus 107. The line-of-sight detection apparatus according to the first or second embodiment of the present technology can be applied to this line-of-sight detection apparatus 107.

(Projection Position Adjustment Mechanism)

The projection position adjustment mechanisms 105L-1 and 105L-2 and 105R-1 and 105R-2 adjust a projection position of the video display light emitted from the display apparatus 100. It should be noted that in the present specification, these four projection position adjustment mechanisms will be sometimes called together projection position adjustment mechanism 105. The projection position adjustment mechanism 105 may be configured to adjust the projection position of the video display light, for example, following the lines-of-sight. Alternatively, the projection position adjustment mechanism 105 is capable of adjusting the projection position of the video display light in accordance with a wearing error, for example.

In addition, the projection position adjustment mechanism 105 is capable of adjusting the projection position of the video display light in accordance with a rotational movement of the eyeball or a movement of the line-of-sight. For example, with the provided projection position adjustment mechanism 105, the display apparatus 100 is capable of adjusting the position of the image presented to the user to a more appropriate position. For example, when superimposing an image presented to the user on the external landscape, the image can be displayed at a more appropriate position by the line-of-sight detection apparatuses 107L and 107R detecting line-of-sights of the user. That is, providing the line-of-sight detection apparatus 107 is favorable for presentation of AR information, for example.

Moreover, the projection position adjustment mechanism 105 can also be used for adjusting a position at which the video display light is concentrated in image display in the Maxwellian view.

The projection position adjustment mechanisms 105L-1 and 105L-2 adjust a projection position of video display light projected to the left eye.

The projection position adjustment mechanism 105L-1 adjusts a position relationship between the internal rim portion 106L and the rim portion 108L in a z-axis direction. For example, the projection position adjustment mechanism 105L-1 moves the internal rim portion 106L with respect to the rim portion 108L in the z-axis direction. Accordingly, the position of the HOE 103L in the z-axis direction is adjusted.

The projection position adjustment mechanism 105L-2 adjusts a position relationship between the HOE 103L and the internal rim portion 106L in an x-axis direction. For example, the projection position adjustment mechanism 105L-2 moves the HOE 103L with respect to the internal rim portion 106L in the x-axis direction. Accordingly, the position of the HOE 103L in the x-axis direction is adjusted.

Driving elements for moving the internal rim portion 106L and the HOE 103L may be, for example, piezoelectric elements, actuators, or bi-metallic strips, though not limited thereto.

The projection position adjustment mechanism 105L-1 is capable of adjusting a position relationship between the internal rim portion 106L and the rim portion 108L in the z-axis direction, for example, on the basis of a change(s) in position of the display apparatus 100 detected by one, two, three, or four of the sensors 104L, 104R, 104C, and 104T. Moreover, the projection position adjustment mechanism 105L-1 may adjust the position relationship on the basis of the change(s) in position and the line-of-sight detected by the line-of-sight detection apparatus 107L.

Similarly, the projection position adjustment mechanism 105L-2 is capable of adjusting a position relationship between the HOE 103L and the internal rim portion 106L in the x-axis direction, for example, on the basis of change(s) in position of the display apparatus 100 detected by one, two, three, or four of the sensors 104L, 104R, 104C, and 104T. Moreover, the projection position adjustment mechanism 105L-2 may adjust the position relationship on the basis of the change(s) in position and the line-of-sight detected by the line-of-sight detection apparatus 107L.

The projection position adjustment mechanisms 105R-1 and 105R-2 adjust a projection position of video display light projected to the right eye. The adjustment may be performed as in the projection position adjustment mechanisms 105L-1 and 105L-2.

(Control Unit and Storage Unit)

Figures 7, 8, 9:
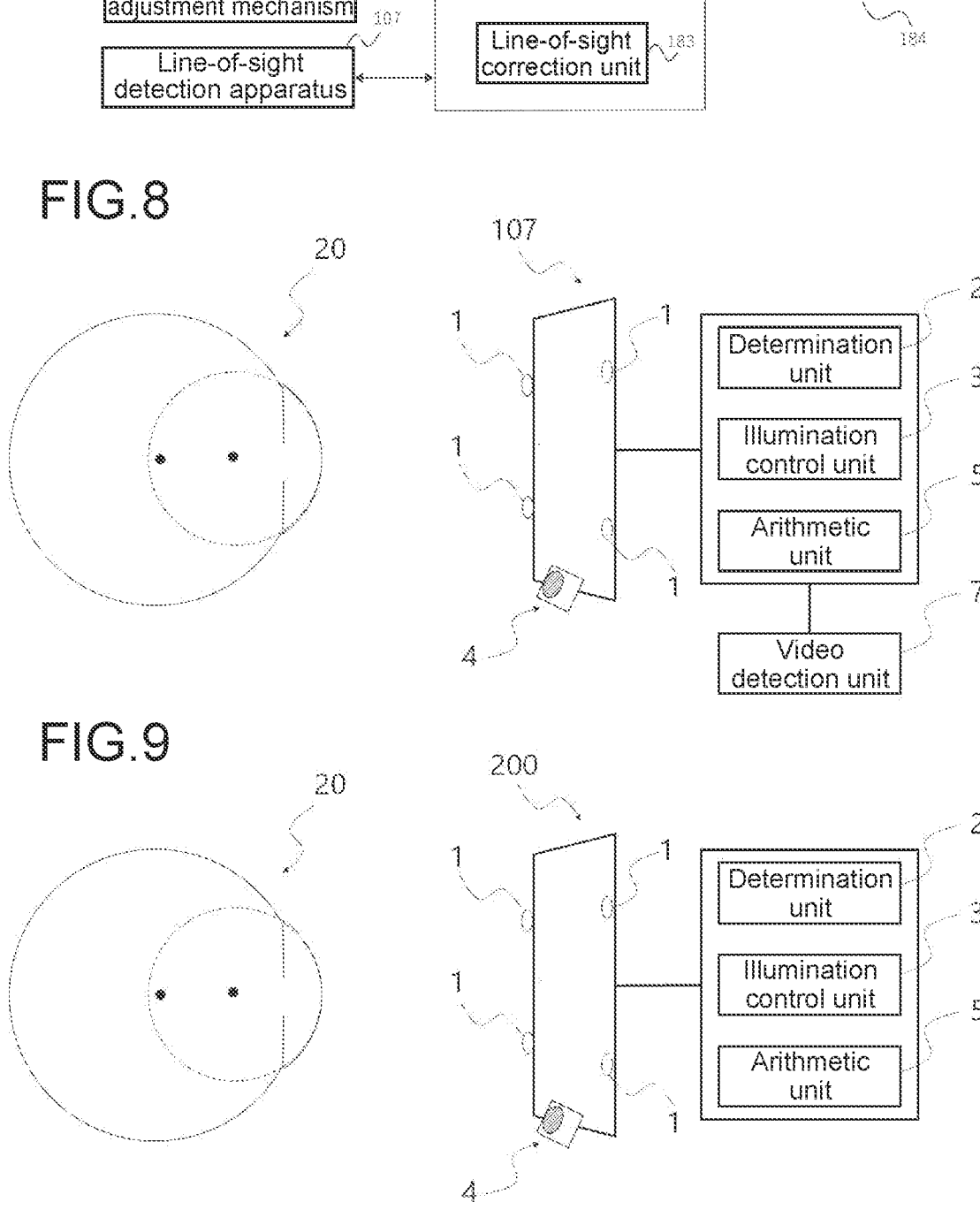
FIG. 7 A block diagram showing a configuration example of the display apparatus 100 according to the third embodiment of the present technology.
FIG. 8 A schematic diagram showing a configuration example of a line-of-sight detection apparatus 107 according to a fifth embodiment of the present technology.
FIG. 9 A schematic diagram showing a configuration example of a line-of-sight detection system 200 according to a sixth embodiment of the present technology.

The control unit and the storage unit will be described with reference to FIG. 7. FIG. 7 is a block diagram showing a configuration example of the display apparatus 100 according to the third embodiment of the present technology. As shown in FIG. 7, the display apparatus 100 has a control unit 112. The control unit 112 includes, for example, an image control unit 181, a projection position control unit 182, and a line-of-sight correction unit 183.

The image control unit 181 controls projection of the video display light by the video display unit. The image control unit 181 drives, for example, the light source units 101L and 101R, and particularly the laser light source and the scanning mirror included in these light source units to output the video display light. The image control unit 181 can, for example, obtain image data stored in a storage unit 184 and cause the light source units 101L and 101R to output the video display light on the basis of the image data.

The image control unit 181 may correct the image data on the basis of a change in position of the display apparatus 100 with respect to the head of the user detected by the sensor 104. The image control unit 181 may cause the light source units 101L and 101R to output the video display light on the basis of the corrected image data. That is, the display apparatus 100 may correct the image on the basis of a change in position detected by a sensor that detects a change in position of a head-mounted display apparatus with respect to the head of the user.

The projection position control unit 182 controls the projection position of the video display light by controlling the projection position adjustment mechanisms 105L-1, 105L-2, 105R-1, and 105R-2. For example, the projection position control unit 182 can drive one to four of the projection position adjustment mechanisms 105L-1, 105L-2, 105R-1, and 105R-2 on the basis of lines-of-sight detected by the line-of-sight detection apparatuses 107L and 107R to control the projection position of the video display light. For example, the projection position of the video display light can be controlled to follow the lines-of-sight.

The projection position control unit 182 may drive one to four of the projection position adjustment mechanisms 105L-1, 105L-2, 105R-1, and 105R-2 on the basis of lines-of-sight corrected by the line-of-sight correction unit 183 to be described later and control the projection position of the video display light. For example, the projection position of the video display light can be controlled to follow the corrected lines-of-sight.

The projection position control unit 182 may drive one to four of the projection position adjustment mechanisms 105L-1, 105L-2, 105R-1, and 105R-2 and control the projection position of the video display light on the basis of data (hereinafter, also referred to as "displacement data") related to a change(s) in position of the display apparatus 100 with respect to the head of the user, which has been detected by one to four of the sensors 104L, 104R, 104C, and 104T.

For example, based on such displacement data and a correction coefficient, the projection position control unit 182 can calculate an amount of position adjustment by each projection position adjustment mechanism. The projection position control unit 182 can drive each projection position adjustment mechanism to change the position relationship by the calculated amount of position adjustment. The projection position control unit 182 may obtain a correction coefficient from a correction table prestored in the storage unit 184, for example, and use the correction coefficient for calculating the amount of position adjustment. The correction table may include a plurality of correction coefficients, for example, and the projection position control unit 182 can select a predetermined correction coefficient from these correction coefficients in accordance with the displacement data. Moreover, the correction table may be provided for each projection position adjustment mechanism, for example. The correction table may be provided in the display apparatus 100 in advance or may be updated in accordance with the use of the display apparatus 100 by the user. Selecting or updating the correction table or the correction coefficients can improve the accuracy of projection position control. The projection position control unit 182 may use lines-of-sight detected by the line-of-sight detection apparatus or lines-of-sight corrected by the line-of-sight correction unit 183 for calculating the amount of position adjustment.

The line-of-sight correction unit 183 corrects the lines-of-sight detected by the line-of-sight detection apparatuses 107L and 107R on the basis of the displacement data. Accordingly, the line-of-sight correction unit 183 enables identification of lines-of-sight considering a wearing error, which improves the line-of-sight detection accuracy. The correction may be performed with respect to the optical axes of the eyeballs, may be performed with respect to the visual axes of the eyeballs, or may be performed with respect to other reference axes. As in the projection position control unit 182, the line-of-sight correction unit 183 may also obtain correction coefficients from a correction table prestored in the storage unit 184, for example, and use the correction coefficients for correcting the lines-of-sight.

The display apparatus 100 may further include the storage unit 184. The storage unit may store data related to the video display light projected by the video display unit, a correction table used for the projection position control by the projection position control unit 122, and a correction table used for the line-of-sight correction by the line-of-sight correction unit 123.

The above-mentioned contents of the display apparatus according to the third embodiment of the present technology can be applied to other embodiments of the present technology unless technical contradictions are caused.

5. Fourth Embodiment (Example 2 of Display Apparatus)

A display apparatus according to a fourth embodiment of the present technology is a display apparatus including an action detection unit that detects an action of the user, in which the determination unit obtains the determination result that the action of the user has been made on the basis of a detection result of the action detection unit and the illumination control unit causes the illumination unit to illuminate the eye on the basis of the determination result.

For example, an acceleration sensor, an angular velocity sensor, and an inertial measurement unit (IMU) can be used as the action detection unit.

By the action detection unit detecting the action of the user, the line-of-sight detection apparatus 107 can obtain the eye-related position information at an appropriate time. As a result, the line-of-sight detection apparatus 107 can highly accurately obtain eye-related position information.

The action of the user may include the display apparatus 100 being worn by the head of the user. For example, the sensor 104 described above in the third embodiment can also be the action detection unit. The sensor 104 detects an action of the user in which the display apparatus 100 is worn by the head of the user.

The determination unit 2 obtains the determination result that the action of the user has been made in a case where the display apparatus 100 is worn by the head of the user. Accordingly, the line-of-sight detection apparatus 107 can obtain the eye-related position information at an appropriate time. As a result, the line-of-sight detection apparatus 107 can highly accurately obtain eye-related position information.

For example, the time at which the user corrects the wrongly worn display apparatus 100 to a correct position, an appropriate time to obtain the eye-related position information.

Moreover, the action of the user may include an operation of the user with respect to the display apparatus 100 being made.

The determination unit 2 obtains the determination result that the action of the user has been made in a case where the operation of the user with respect to the display apparatus 100 has been made. Accordingly, the line-of-sight detection apparatus 107 can obtain the eye-related position information at an appropriate time. As a result, the line-of-sight detection apparatus 107 can highly accurately obtain eye-related position information.

For example, the time at which the user operates the display apparatus 100 through a controller or like is an appropriate time to obtain the eye-related position information because it is the time at which the user attempts to see a particular object.

The above-mentioned contents of the display apparatus according to the fourth embodiment of the present technology can be applied to other embodiments of the present technology unless technical contradictions are caused.

6. Fifth Embodiment (Example 3 of Display Apparatus)

A display apparatus according to a fifth embodiment of the present technology is a display apparatus further including a video detection unit that detects a video displayed by the display apparatus, in which the determination unit obtains the determination result that the video has changed on the basis of a detection result of the video detection unit and the illumination control unit causes the illumination unit to illuminate the eye on the basis of the determination result.

A line-of-sight detection apparatus provided in the display apparatus according to the fifth embodiment of the present technology will be described with reference to FIG. 8. FIG. 8 is a schematic diagram showing a configuration example of the line-of-sight detection apparatus 107 according to the fifth embodiment of the present technology.

As shown in FIG. 8, the line-of-sight detection apparatus 107 according to the fifth embodiment of the present technology further includes a video detection unit 7 that detects the video displayed by the display apparatus 100. The video detection unit 7 obtains, in particular, brightness of the video displayed by the display apparatus 100 as a numeric value. For example, a photodiode can be used as the video detection unit 7.

The determination unit 2 obtains a determination result that the video has changed on the basis of a detection result of the video detection unit 7. For example, in a case where the photodiode is used as the video detection unit 7, the detection result includes a luminance of the video. In a case where an amount of change in luminance is equal to or larger than a predetermined threshold, the determination unit 2 obtains the determination result that the video has changed. For example, in a case where the changed luminance is ten times or more as high as the luminance before the change or in a case where the changed illuminance is equal to or lower than 1/10 of the illuminance before the change, the determination unit 2 obtains the determination result that the video has changed.

The illumination control unit 3 causes the illumination unit 1 to illuminate the eye on the basis of the determination result. Accordingly, the line-of-sight detection apparatus 107 can obtain the eye-related position information at an appropriate time. As a result, the line-of-sight detection apparatus 107 can highly accurately obtain eye-related position information.

The pupil diameter size of the user will change, for example, when a dark video is switched to a bright video. Therefore, the illumination unit 1 is caused to illuminate the eye.

The above-mentioned contents of the display apparatus according to the fifth embodiment of the present technology can be applied to other embodiments of the present technology unless technical contradictions are caused.

7. Sixth Embodiment (Example of Line-of-Sight Detection System)

A line-of-sight detection system according to a sixth embodiment of the present technology is a line-of-sight detection system including an illumination unit that illuminates an eye with a plurality of illumination light rays, a determination unit that determines a time to cause the illumination unit to illuminate the eye, an illumination control unit that controls the illumination unit, an image pickup element having an event-driven function, and an arithmetic unit that computes eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

The line-of-sight detection system according to the sixth embodiment of the present technology will be described with reference to FIG. 9. FIG. 9 is a schematic diagram showing a configuration example of the line-of-sight detection system 200 according to the sixth embodiment of the present technology.

As shown in FIG. 9, the line-of-sight detection system 200 according to the sixth embodiment of the present technology includes an illumination unit 1 that illuminates an eye with a plurality of illumination light rays, a determination unit 2 that determines a time to cause the illumination unit 1 to illuminate the eye, an illumination control unit 3 that controls the illumination unit 1, an image pickup element 4 having the event-driven function, and an arithmetic unit 5 that computes the eye-related position information.

The illumination control unit 3 causes the illumination unit 1 to illuminate the eye on the basis of a determination result of the determination unit 2.

The image pickup element 4 generates event information by receiving light reflected from the eye.

The arithmetic unit 5 computes eye-related position information on the basis of the event information.

The above-mentioned contents of the line-of-sight detection system according to the sixth embodiment of the present technology can be applied to other embodiments of the present technology unless technical contradictions are caused.

8. Seventh Embodiment (Example of Line-of-Sight Detection Method)

A line-of-sight detection method according to a seventh embodiment of the present technology is a line-of-sight detection method including determining a time to illuminate the eye, illuminating the eye with a plurality of illumination light rays on the basis of a result of the determination, generating event information by receiving light reflected from the eye through an image pickup element having an event-driven function, and computing eye-related position information on the basis of the event information.

Figure 10:
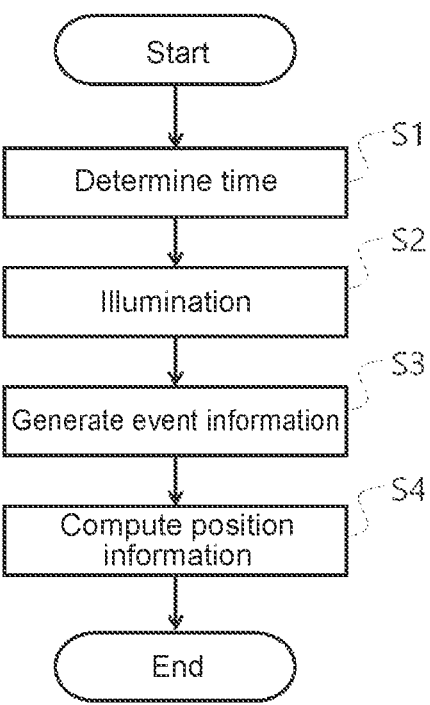
FIG. 10 A flowchart showing an example of a line-of-sight detection method according to a seventh embodiment of the present technology.

The line-of-sight detection method according to the seventh embodiment of the present technology will be described with reference to FIG. 10. FIG. 10 is a flowchart showing an example of the line-of-sight detection method according to the seventh embodiment of the present technology.

As shown in FIG. 10, in the line-of-sight detection method according to the seventh embodiment of the present technology, in Step S1, for example, the determination unit 2 according to the other embodiment determines a time to illuminate the eye.

Next, in Step S2, for example, the illumination unit 1 according to the other embodiment illuminates the eye with a plurality of illumination light rays on the basis of a result of the determination.

Next, in Step S3, for example, the image pickup element 4 having the event-driven function according to the other embodiment generates event information by receiving light reflected from the eye.

Next, in Step S4, for example, the arithmetic unit 5 according to the other embodiment computes eye-related position information on the basis of the event information.

The above-mentioned contents of the line-of-sight detection method according to the seventh embodiment of the present technology can be applied to other embodiments of the present technology unless technical contradictions are caused.

It should be noted that the embodiments according to the present technology are not limited to each of the above-mentioned embodiments, and various modifications can be made without departing from the gist of the present technology.

Moreover, the effects described in the present specification are merely exemplary and not limitative and other effects may be provided.

Moreover, the present technology can also take the following configurations.

[1] A line-of-sight detection apparatus, including:
an illumination unit that illuminates an eye with a plurality of illumination light rays;
a determination unit that determines a time to cause the illumination unit to illuminate the eye;
an illumination control unit that controls the illumination unit;
an image pickup element having an event-driven function; and
an arithmetic unit that computes eye-related position information, in which
the illumination control unit causes the illumination unit to illuminate the eye on the basis of a determination result of the determination unit,
the image pickup element generates event information by receiving light reflected from the eye, and
the arithmetic unit computes the eye-related position information on the basis of the event information.

[2] The line-of-sight detection apparatus according to [1], in which
the determination unit obtains the determination result that a movement of a user has occurred on the basis of the event information, and the illumination control unit causes the illumination unit to illuminate the eye on the basis of the determination result.

[3] The line-of-sight detection apparatus according to [2], in which
the movement of the user includes an open/close movement of an eyelid, and
the determination unit obtains the determination result that the movement of the user has occurred in a case where the open/close movement of the eyelid has been made.

[4] The line-of-sight detection apparatus according to [2] or [3], in which
the movement of the user includes a change in pupil diameter size, and
the determination unit obtains the determination result that the movement of the user has occurred in a case where an amount of change in pupil diameter size is equal to or larger than a predetermined threshold.

[5] The line-of-sight detection apparatus according to any one of [2] to [4], in which
the movement of the user includes a saccade, and
the determination unit obtains the determination result that the movement of the user has occurred in a case where velocity of the saccade is equal to or larger than a predetermined threshold.

[6] The line-of-sight detection apparatus according to any one of [1] to [5], further including
an environment detection unit that detects an environment of a user, in which
the determination unit obtains the determination result that the environment of the user has changed on the basis of a detection result of the environment detection unit, and
the illumination control unit causes the illumination unit to illuminate the eye on the basis of the determination result.

[7] The line-of-sight detection apparatus according to [6], in which
the detection result of the environment detection unit includes an illuminance, and
the determination unit obtains the determination result that the environment of the user has changed in a case where an amount of change in illuminance is equal to or larger than a predetermined threshold.

[8] A display apparatus at least including
a line-of-sight detection apparatus according to any one of [1] to [7].

[9] The display apparatus according to [8], further including
an action detection unit that detects an action of a user, in which
the determination unit obtains the determination result that an action of the user has been made on the basis of a detection result of the action detection unit, and
the illumination control unit causes the illumination unit to illuminate the eye on the basis of the determination result.

[10] The display apparatus according to [9], in which
the action of the user includes the display apparatus being worn by a head of the user, and
the determination unit obtains the determination result that the action of the user has been made in a case where the display apparatus is worn by the head of the user.

[11] The display apparatus according to [9] or [10], in which the action of the user includes an operation of the user being made on the display apparatus, and the determination unit obtains the determination result that the action of the user has been made in a case where the operation of the user is made on the display apparatus.

[12] The display apparatus according to any one of [8] to [11], further including a video detection unit that detects a video displayed by the display apparatus, in which the determination unit obtains the determination result that the video has changed on the basis of a detection result of the video detection unit, and the illumination control unit causes the illumination unit to illuminate the eye on the basis of the determination result.

[13] The display apparatus according to [12], in which the detection result of the video detection unit includes a luminance of the video, and the determination unit obtains the determination result that the video has changed in a case where an amount of change in luminance is equal to or larger than a predetermined threshold.

[14] A line-of-sight detection system, including:

an illumination unit that illuminates an eye with a plurality of illumination light rays;

a determination unit that determines a time to cause the illumination unit to illuminate the eye;

an illumination control unit that controls the illumination unit;

an image pickup element having an event-driven function; and an arithmetic unit that computes eye-related position information, in which the illumination control unit causes the illumination unit to illuminate the eye on the basis of a determination result of the determination unit, the image pickup element generates event information by receiving light reflected from the eye, and the arithmetic unit computes the eye-related position information on the basis of the event information.

[15] A line-of-sight detection method, including:

determining a time to illuminate an eye;

illuminating the eye with a plurality of illumination light rays on the basis of a result of the determination;

generating event information by receiving light reflected from the eye through an image pickup element having an event-driven function; and computing eye-related position information on the basis of the event information.

REFERENCE SIGNS LIST 1 illumination unit
2 determination unit
3 illumination control unit
4 image pickup element
5 arithmetic unit
6 environment detection unit
7 video detection unit
20 eye
21 pupil
22 iris
23 Purkinje image
100 display apparatus
101L, 101R light source unit 102L, 102R projection optical system
103L, 103R HOE
104 sensor
105 projection position adjustment mechanism
106L, 106R internal rim portion
107 line-of-sight detection apparatus
108L, 108R rim portion
109L, 109R temple portion
110 bridge portion
111 headband portion
112 control unit
181 image control unit
182 projection position control unit
183 line-of-sight correction unit
184 storage unit
200 line-of-sight detection system
S1 to determine time to illuminate eye
S2 to illuminate eye with plurality of illumination light rays
S3 to generate event information
S4 to compute eye-related position information

What is claimed is:

1. A line-of-sight detection apparatus, comprising:

an illumination unit that illuminates an eye with a plurality of illumination light rays;

a determination unit that determines a time to cause the illumination unit to illuminate the eye;

an illumination control unit that controls the illumination unit;

an image pickup element having an event-driven function; and an arithmetic unit that computes eye-related position information, wherein the illumination control unit causes the illumination unit to illuminate the eye on a basis of a determination result of the determination unit, wherein the image pickup element generates event information by receiving light reflected from the eye, wherein the arithmetic unit computes the eye-related position information on a basis of the event information, wherein the determination unit obtains the determination result that a movement of a user has occurred on a basis of the event information, and wherein the illumination control unit causes the illumination unit to illuminate the eye on a basis of the determination result.

2. The line-of-sight detection apparatus according to claim 1, wherein the movement of the user includes an open/close movement of an eyelid, and the determination unit obtains the determination result that the movement of the user has occurred in a case where the open/close movement of the eyelid has been made.

3. The line-of-sight detection apparatus according to claim 1, wherein the movement of the user includes a change in pupil diameter size, and the determination unit obtains the determination result that the movement of the user has occurred in a case where an amount of change in pupil diameter size is equal to or larger than a predetermined threshold.

4. The line-of-sight detection apparatus according to claim 1, wherein the movement of the user includes a saccade, and the determination unit obtains the determination result that the movement of the user has occurred in a case where velocity of the saccade is equal to or larger than a predetermined threshold.

5. A line-of-sight detection apparatus, comprising:

an illumination unit that illuminates an eye with a plurality of illumination light rays;

a determination unit that determines a time to cause the illumination unit to illuminate the eye;

an illumination control unit that controls the illumination unit;

an image pickup element having an event-driven function;

an arithmetic unit that computes eye-related position information, wherein the illumination control unit causes the illumination unit to illuminate the eye on a basis of a determination result of the determination unit, wherein the image pickup element generates event information by receiving light reflected from the eye, and wherein the arithmetic unit computes the eye-related position information on a basis of the event information; and an environment detection unit that detects an environment of a user, wherein the determination unit obtains the determination result that the environment of the user has changed on a basis of a detection result of the environment detection unit, and wherein the illumination control unit causes the illumination unit to illuminate the eye on a basis of the determination result.

6. The line-of-sight detection apparatus according to claim 5, wherein the detection result of the environment detection unit includes an illuminance, and the determination unit obtains the determination result that the environment of the user has changed in a case where an amount of change in illuminance is equal to or larger than a predetermined threshold.

7. A display apparatus, comprising:

a line-of-sight detection apparatus according to claim 1.

8. A display apparatus, comprising:

a line-of-sight detection apparatus, including:

an illumination unit that illuminates an eye with a plurality of illumination light rays;

a determination unit that determines a time to cause the illumination unit to illuminate the eye;

an illumination control unit that controls the illumination unit;

an image pickup element having an event-driven function; and an arithmetic unit that computes eye-related position information, wherein the illumination control unit causes the illumination unit to illuminate the eye on a basis of a determination result of the determination unit, wherein the image pickup element generates event information by receiving light reflected from the eye, and wherein the arithmetic unit computes the eye-related position information on a basis of the event information; and an action detection unit that detects an action of a user, wherein the determination unit obtains the determination result that an action of the user has been made on a basis of a detection result of the action detection unit, and wherein the illumination control unit causes the illumination unit to illuminate the eye on a basis of the determination result of the action detection unit.

9. The display apparatus according to claim 8, wherein the action of the user includes the display apparatus being worn by a head of the user, and the determination unit obtains the determination result that the action of the user has been made in a case where the display apparatus is worn by the head of the user.

10. The display apparatus according to claim 8, wherein the action of the user includes an operation of the user being made on the display apparatus, and the determination unit obtains the determination result that the action of the user has been made in a case where the operation of the user is made on the display apparatus.

11. A display apparatus, comprising:

a line-of-sight detection apparatus, comprising:

an illumination unit that illuminates an eye with a plurality of illumination light rays;

a determination unit that determines a time to cause the illumination unit to illuminate the eye;

an illumination control unit that controls the illumination unit;

an image pickup element having an event-driven function; and an arithmetic unit that computes eye-related position information, wherein the illumination control unit causes the illumination unit to illuminate the eye on a basis of a determination result of the determination unit, wherein the image pickup element generates event information by receiving light reflected from the eye, wherein the arithmetic unit computes the eye-related position information on a basis of the event information; and a video detection unit that detects a video displayed by the display apparatus, wherein the determination unit obtains the determination result that the video has changed on a basis of a detection result of the video detection unit, and wherein the illumination control unit causes the illumination unit to illuminate the eye on a basis of the determination result.

12. The display apparatus according to claim 11, wherein the detection result of the video detection unit includes a luminance of the video, and the determination unit obtains the determination result that the video has changed in a case where an amount of change in luminance is equal to or larger than a predetermined threshold.

* * * * *